Aug. 18, 1925. 1,550,185

C. STEENSTRUP

HEATING PLATE

Filed Dec. 20, 1923

Inventor:
Christian Steenstrup,
by
His Attorney.

Patented Aug. 18, 1925.

1,550,185

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

HEATING PLATE.

Application filed December 20, 1923. Serial No. 681,863.

*To all whom it may concern:*

Be it known that I, CHRISTIAN STEENSTRUP, a citizen of the United States, residing at Schenectady, in the county of Schenectady, State of New York, have invented certain new and useful Improvements in Heating Plates, of which the following is a specification.

It is common practice in various arts to use what are termed steam plates. These are commonly placed in a stack in an hydraulic press and the material to be treated is located between them. Steam is admitted to the interior of the plates to heat them and the material being treated, and afterwards cold water is circulated through the plates to cool them and the material being treated. For many classes of work, this is entirely satisfactory but much difficulty is experienced when it is desired to subject the plates to high temperatures where steam is the heating medium because the pressure of the steam is increased along with its temperature. To avoid this objection it has been proposed to use a highly heated fluid such as hot oil for example, but this is also objectionable for various reasons, principal among which is the tendency of the oil to foam and the rather complicated apparatus required in its production and regulation. Such an arrangement also requires the use of a separate oil cooler of very large capacity. As a result the operation is very inefficient.

My invention has for its object the provision of a heating plate which is thin, strong, simple in construction and which may be alternately heated to high temperatures and cooled.

For a consideration of what I believe to be novel and my invention, attention is directed to the accompanying description and claims appended thereto.

Figures 1, 2:
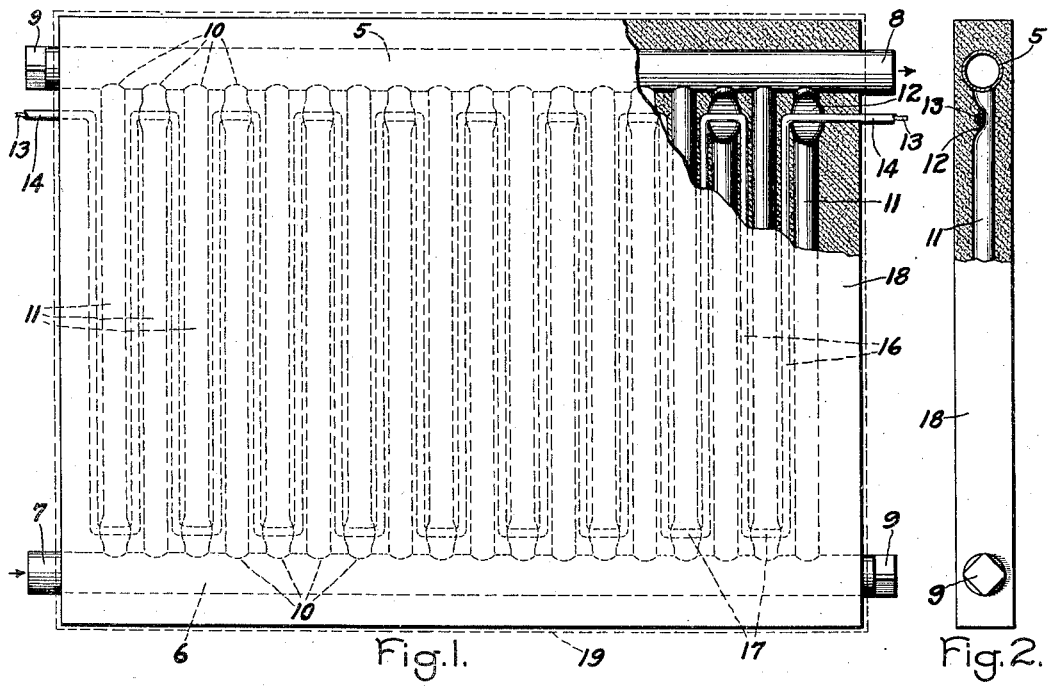
Figure 4:
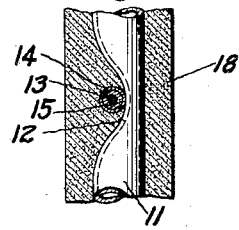
Figure 5:
Figure 6:
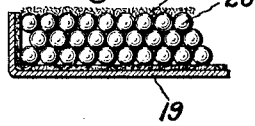
Figure 3:
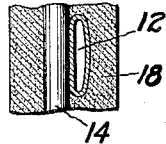
Figure 7:
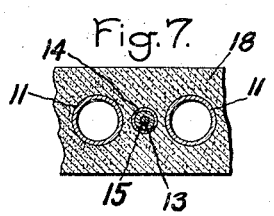

In the drawing which is illustrative of my invention, Fig. 1 is a plan view of a heating plate; Fig. 2 is an edge view of the same; Fig. 3 is a partial longitudinal section taken where a part of the heating unit crosses one of the cooling tubes; Fig. 4 is a cross-section taken at a right angle to that of Fig. 3; Fig. 5 is a cross-section of the heating unit; Fig. 6 is an enlarged view in section of the backing or supporting material; Fig. 7 is a cross-sectional view through a pair of adjacent tubes and the heating element between them, and Fig. 8 is a diagrammatic view showing a divided heating element.

In carrying out my invention, a pair of manifolds 5 and 6 are provided which may be made of steel tubing of any cross-section but are preferably round. In some cases one inlet and one outlet is provided for the cooling fluid, the other ends of the manifolds being plugged in the usual way. In other cases fluid may be admitted at both ends of one manifold and discharged at both ends of the other manifold. As shown the cooling fluid enters at the inlet 7 and is discharged at the outlet 8, the other ends of the manifold being closed by pipe plugs 9. Each manifold has drilled therein a number of spaced openings 10 arranged in the same longitudinal plane, the openings in one manifold facing those in the other. In each pair of registering openings in the opposed manifolds are inserted the ends of cross tubes 11 which may be of any section but are preferably round. The joints between these parts are snugly fitted but no attempt is made to make them fluid-tight at this stage in the manufacture. In order to provide for the electrical heating unit which will be described later each tube before assembly is flattened near one end as indicated at 12 in Figs. 3 and 4, to permit the heating unit to cross over from one side of each cross tube to the opposite side. Owing to the fact that the tube spreads laterally in the flattening operation there is very little change in the cross-sectional area of the fluid-conducting passage.

The heating unit comprises a continuous piece of resistance wire or material 13, which is enclosed in a steel sheath 14, there being a compacted body of insulation 15 between the two. Heating units made of this material are well known and are commonly referred to as "sheathed wire" heating units. The heating unit is bent to form a grid having parallel elements 16 which are interspersed with the cross tubes 11 and cross-over or connecting elements 17 which occupy the depressed or flattened portions in the cross tubes, it being noted that the depressed portions in the adjacent tubes are arranged at opposite ends. It is also to be noted that the heating unit is located wholly between the manifolds which has the advantage from a mechanical standpoint of avoiding the necessity of changing the shape of the manifolds or of cutting holes therein, and has the advantage from a thermal standpoint of having the heating unit entirely within the supporting or backing material so that the heat will be uniformly distributed throughout its mass, there being no projecting portions which can radiate heat to the open air. Another reason for placing the main elements of the heating unit between the tubes as distinguished from placing them above or below is to enable the plate to be made as thin as possible consistent with the necessary strength and rigidity.

Figure 8:
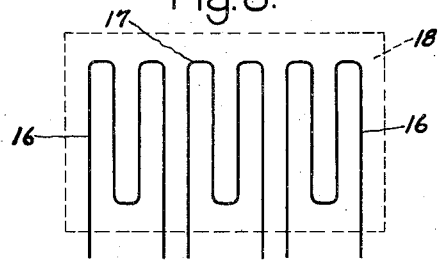

The heating unit is shown as being continuous from end to end, an arrangement well adapted for plates of limited size but where the plates are of large surface area the unit may be divided into sections as is well understood in the electrical art and the current supplied by separate connections to the terminals of the different sections as indicated diagrammatically in Fig. 8.

The backing or support for the heating and cooling elements may be made in different ways, so long as there is good thermal conductivity between it and said elements. I prefer, however, to employ for the purpose the new metal invented by me which forms the subject matter of my pending application for patent, Serial No. 628,926, filed March 30, 1923. Briefly stated, this metal as applied to the present invention comprises a base of small, self-packing, mild steel shot having capillary spaces or voids between them and a void-filling and fusing metal such as copper, the parts being united by fusion in a closed furnace in which a supply of selected gas such as hydrogen is maintained during the fusing operation.

In forming the support or backing member 18 for my improved plate, a container of suitable size and shape to conform to the finished plate and lined with asbestos or equivalent material is provided as indicated by the dotted lines 19.

In this container the heating and cooling elements are placed and suitably supported so as to leave proper spaces for the filling material. I then pour mild steel shot into the container and fill it to the desired level, shaking the container, if necessary, to cause the shot to completely fill all of the available spaces. The shot 20 is shown on a greatly exaggerated scale in Fig. 6. Small pieces of copper 21 from which the impurities have been removed are well distributed over the top of the shot and the container and its contents are then placed in a closed furnace in which a supply of selected gas, such as hydrogen, is constantly maintained during the working period. The temperature of the furnace is then raised to a point slightly above the melting temperature of the copper or fusing metal. When such temperature is reached the copper melts and flows by capillary action through the capillary voids or spaces between the shot and into the joints between the manifolds and cross tubes, with the result, when the copper hardens, of uniting the entire structure into a unitary mass. The copper alloys with the steel to a certain extent and in so doing causes complete union of the various parts which means high thermal conductivity and freedom from the objectionable gas pockets and failure to properly bond as in a casting operation.

After the fusing operation is completed, and this can be easily observed through sight tubes in the furnace wall, the temperature of the furnace is reduced and preferably rather sharply at the start to cause the fusing metal to harden. When properly cooled, the container and its contents are removed from the furnace and the plate removed from its container or former, after which the plate is machined by the ordinary methods.

The outstanding advantage of my improved construction resides in the fact that the plate can be quickly heated to a very high temperature by admitting a suitable amount of current to the heating unit and quickly cooled by shutting off the current and admitting water or other cooling fluid to the manifolds and tubes. The means for controlling the amount of current may be of any simple, ordinary construction as may also be the means for admitting the cooling fluid. Another great advantage resides in the fact that the walls of the heating unit and those of the cooling elements are fused to the support and hence the thermal conductivity is the same as though the metal parts were made in one piece. A further advantage resides in the fact that the plate can be made much thinner than those heretofore constructed which means that a greater number can be put in a press of given size at the same time thereby increasing its output in proportion to the added number of plates. The plates are very strong and hence will withstand heavy pressure, are easily machined by ordinary methods to provide the desired smooth surfaces and are entirely free from imperfections.

It will be noted that a portion of the heating unit is located between each two cooling tubes and that both the parts of the unit and the tubes are uniformly distributed throughout the plate. This has the advantage of uniformly heating the plate when a current of electricity is admitted to the unit, and of uniformly cooling the element when the current is shut off and water admitted to the tubes. The fact that the tubes are in close proximity to all of the elements of the heater means that the heat will be quickly absorbed by the water.

I have described my invention in connection with a flat plate or support but it may also be used with great advantage in the manufacture of coil moulds and the like. In such cases the plate or support instead of being flat will be modified to correspond to the shape of the article being treated.

In accordance with the provisions of the patent statutes, I have described the principle of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a heating plate, the combination of a metal support, an electric heating unit comprising spaced elements located wholly within said support, the wall of which is united to said support for heating it, and a cooling means comprising spaced elements also located wholly within the support and in proximity to the heating element for cooling the support when current is shut off from the unit, the walls of said elements being united to said support.

2. In a heating plate, the combination of a metal support, a metal-encased heating unit comprising spaced elements embedded in said support and united to the walls thereof, a cooling tube also embedded in the support and united to the body thereof for cooling it when current is shut off from the unit, and an inlet and an outlet for the tube.

3. In a heating plate, the combination of a plurality of spaced cooling tubes, an electrical heating unit the elements of which are distributed about the tubes, and a metal enclosure for the tubes and unit, the walls of the tubes and unit being fused to the said enclosure.

4. In a heating plate, the combination of a plurality of spaced metal cooling tubes, a metal-encased electrical heating unit the elements of which are in spaced relation with respect to the tubes, and a metal support to which the walls of the tubes and the casing of the unit are fused.

5. In a heating plate, the combination of a plurality of cooling tubes, a metal enclosed electrical heating unit, portions of which are interspersed with the tubes, and a metal support in which the tubes and unit are located, the metal enclosure of the unit and the walls of tubes being fused to the support.

6. In a heating plate, the combination of a plurality of spaced metal cooling tubes, means located wholly within the support and connecting the tubes and through which cooling fluid is conveyed, a metal-encased heating unit the elements of which are in spaced relation with respect to the tubes, and a metal support in which the tubes and unit are embedded and are fused into an integral structure.

7. In a heating plate, the combination of a plurality of cooling tubes arranged side by side, an electrical heating unit comprising metal encased elements which extend parallel with the tubes and are located adjacent thereto, and a metal support in which the tubes and unit are embedded and are fused into an integral structure.

8. In a heating plate, the combination of a manifold, a plurality of cooling tubes arranged side by side with their ends opening into the manifold, an electrical unit having main elements which are located between the tubes and extend parallel therewith and other elements therefor which cross over the tubes to connect the main elements, and a metal support in which the tubes and unit are embedded.

9. In a heating plate, the combination of a pair of manifolds, a plurality of cooling tubes arranged side by side with their ends opening into the manifolds, the said cooling tubes having flattened portions, an electrical heating unit having main elements which extend parallel with the tubes and are located between them and elements which cross the tubes at said flattened portions, and a metal support in which the tubes and unit are embedded.

10. In a heating plate, the combination of metal cooling tubes, means for connecting them to permit the flow therethrough of a cooling fluid, a metal-encased electrical heating unit, portions of which are interspersed with the tubes, and a support for the tubes and unit comprising a body of small self-packing metal particles and a void filling metal which unites the tubes and casing of the unit into a unitary structure.

11. In a heating plate, the combination of metal cooling tubes, means for connecting them to permit the flow therethrough of a cooling fluid, a metal-encased electrical heating unit, having main elements which extend parallel with the tubes and are located between them, and other elements which extend across the tubes near their ends to electrically connect the main elements, and a support for the tubes and unit comprising a body of steel shot and a void filling fusing metal which unites the tubes and casing of the unit into a unitary structure.

12. In a heating plate, the combination of a pair of manifolds, spaced cooling tubes the ends of which open into the manifolds, certain of said tubes being flattened at one end, the flattened end of one tube being located at the opposite end from those of the adjacent tubes, a heating unit made in the form of a grid, the long elements of which are situated between the tubes and the short connecting elements crossing over the flattened parts of the tubes, and a metal support in which the manifolds, tubes and units are embedded.

In witness whereof, I have hereunto set my hand this 19th day of December, 1923.

CHRISTIAN STEENSTRUP.